(12) United States Patent
Atkins et al.

(10) Patent No.: US 7,148,990 B2
(45) Date of Patent: Dec. 12, 2006

(54) SYSTEM AND METHOD FOR PRODUCING A PHOTOBOOK

(75) Inventors: Clayton Brian Atkins, Mountain View, CA (US); Daniel Tretter, Palo Alto, CA (US); Qian Lin, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 792 days.

(21) Appl. No.: 10/218,412

(22) Filed: Aug. 15, 2002

(65) Prior Publication Data

US 2004/0032599 A1 Feb. 19, 2004

(51) Int. Cl.
*G06K 15/00* (2006.01)
*G06K 1/00* (2006.01)
*H04N 1/60* (2006.01)

(52) U.S. Cl. .................. 358/1.18; 358/1.9
(58) Field of Classification Search ........... 358/1.18, 358/1.1, 1.9; 345/611–614, 581, 589, 660, 345/231.2, 231.3, 231.4; 707/594, 200; 434/317, 434/619, 308, 309, 318, 455
See application file for complete search history.

(56) References Cited

U.S. PATENT DOCUMENTS

| | | | |
|---|---|---|---|
| 5,798,846 A | 8/1998 | Tretter | |
| 5,867,606 A | 2/1999 | Tretter | |
| 5,901,253 A | 5/1999 | Tretter | |
| 6,016,354 A | 1/2000 | Lin et al. | |
| 6,058,248 A | 5/2000 | Atkins et al. | |
| 6,075,926 A | 6/2000 | Atkins et al. | |
| 6,201,548 B1 | 3/2001 | Cariffe et al. | |
| 6,204,940 B1 * | 3/2001 | Lin et al. | 358/527 |
| 6,310,984 B1 | 10/2001 | Sansom-Wai et al. | |
| 6,456,732 B1 * | 9/2002 | Kimbell et al. | 382/112 |
| 2002/0067507 A1 * | 6/2002 | Kujirai | 358/1.18 |
| 2003/0117658 A1 * | 6/2003 | Takenaga | 358/302 |
| 2004/0004737 A1 * | 1/2004 | Kahn et al. | 358/1.15 |
| 2005/0210413 A1 * | 9/2005 | Quek et al. | |
| 2006/0064639 A1 * | 3/2006 | Reid et al. | |

OTHER PUBLICATIONS

Joe Geigel and Alexander Loui, "Automatic Page Layout Using Genetic Alogrithms for Electronic Albuming", Research and Development, Eastman Kodak Company, 12 pages.*
Joe Geigel et al., Automatic Page Layout Using Genetic Algorithms For Electronic Albuming, Research and Development, Eastman Kodak Company, Rochester, NY USA, 12 pages.
Handbook of Image and Video Processing, San Diego, CA, Academic Press, 2000, pp. 22-31, ISBN 0-12-119790-5, Library of Congress Catalog No. 99-69120.

* cited by examiner

*Primary Examiner*—Douglas Q. Tran

(57) ABSTRACT

A method for producing a set of images as a photobook is provided. The method includes selecting a set of images having meta data and determining an attribute value for an attribute associated with each of the images. After determining an attribute value of an attribute, the method adjusts the attribute value associated with at least one of the images to render the attribute value of the images uniform. The method then organizes the images automatically using the meta data and determines a layout of the photobook by automatically adjusting spatial characteristics of the images within the photobook. Once the method determines a layout of the photobook, the method outputs the photobook.

38 Claims, 5 Drawing Sheets

SYSTEM AND METHOD FOR PRODUCING A PHOTOBOOK

BACKGROUND OF THE INVENTION

1. Field of the Invention

The invention relates to an apparatus and method for assembling a photobook, and more particularly, the invention relates to an apparatus and method for automatically enhancing and arranging a collection of images in a photobook.

2. Background Information

Photobook software applications are available which can accomplish certain aspects of photobook creation such as automatic layout, addition of annotations and printing of the photobook or publication to a website. Printed photobooks are attractive to users of digital cameras because they can be easily bound and printed with text annotations and are easy to carry and share. Available photobook services on the web allow the user to arrange their photos into a photobook with annotations with a few automated features. These web services then print the user's photobook and deliver the photobook to the user.

Examples of web photobook services include www.apple.com/iphoto/book.html available from Apple Computer Inc.™ and www.photoworks.com. The photoworks service allows a user to assemble digital photos one to a page in a printed photobook, with a title page, which is then mailed to the user.

Other photobook software may be downloaded, purchased, or given with digital cameras to assist the user in arranging photos and printing the photos as a book or publishing the photos on a website. One example of photobook software is the HP Photoprinting™ software distributed with certain HP™ products. The HP Photoprinting™ software using templates, includes layout of the photographs on the pages of a photobook and printing of the photographs in a photobook.

Kodak® Picture Software provides basic photo album creation capabilities including simple auto layout where the user can change the page layout templates. However, the software is limited by the available templates.

SUMMARY OF THE INVENTION

The present invention relates to an apparatus and method for automatically enhancing and arranging a collection of images in a photobook.

In one embodiment of the present invention, a system for producing a photobook assembly is disclosed. The system comprises a means for selecting a set of images and a means for determining an attribute value for an attribute associated with each of the images. The system also includes a means for adjusting the attribute value associated with at least one of the images to render the attribute value of the images uniform, and a means for clustering the images automatically using meta data of the images. In addition, the system comprises a means which determines a layout of the photobook using the meta data by automatically adjusting spatial characteristics of the images within the photobook, and a means for outputting the photobook using the attribute value and the layout.

In accordance with exemplary embodiments of the present invention, a method for producing a set of images as a photobook is disclosed. The method comprises selecting a set of images, where each image includes meta data. The method determines an attribute value for an attribute associated with each of the images. The method adjusts the attribute value associated with at least one of the images to render the attribute value of the images uniform. The method organizes the images automatically using the meta data, determines a layout of the photobook by automatically adjusting spatial characteristics of the images within the photobook, and outputs the photobook using the attribute value and the layout.

In an exemplary embodiment of the present invention, a computer readable medium having a program for producing a photobook by executing a procedure for producing a photobook is disclosed. The procedure comprises responding to a request to select a set of images, and determining an attribute value associated with each of the images. The procedure adjusts the attribute value associated with at least one of the images to render the attribute values of the images uniform. The procedure also comprises organizing the images automatically using meta data, and determining a layout of the photobook by automatically adjusting spatial characteristics of the images within the photobook. The procedure outputs the photobook using the attribute value.

BRIEF DESCRIPTION OF THE DRAWING FIGURES

The invention will now be described in greater detail with reference to the preferred embodiments illustrated in the accompanying drawings, in which like elements bear like reference numerals, and wherein.

DETAILED DESCRIPTION OF THE INVENTION

Figure 1:
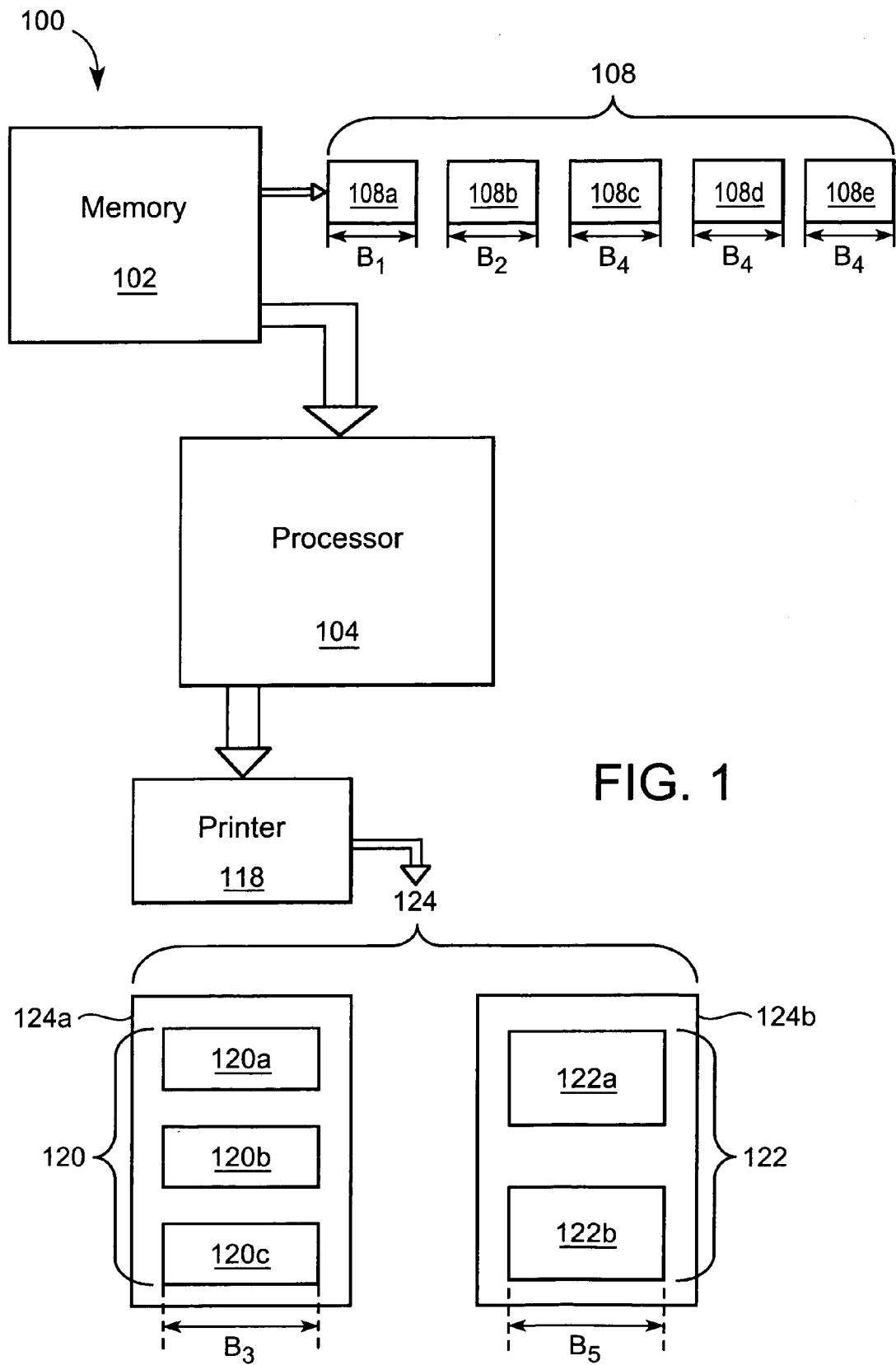
FIG. 1 illustrates an exemplary system for generating a photobook in accordance with an embodiment of the present invention.

FIG. 1 illustrates a system 100 for generating a photobook 124 in accordance with an exemplary embodiment of the present invention. The system 100 includes a means, such as a processor 104, for selecting images, such as the set of images 108. The processor 104 can be any device having a processor capable of selecting images local and remote to the processor, such as a personal computer or the like. The images 108 can be any type of information digitally stored in memory, such as digital photographs, scanned films and articles, photographs, slides, electronic documents or the like. The images can also be represented in electronic document form, such as text, graphs, tables, and the like.

The images include meta data associated with each image of the images 108. The meta data can include time, date and location information (e.g., the geographic location of where a digital photograph was taken, etc.), camera control setting information and other information associated with the images. The images selected by the processor 104 are stored on memory 102, which can be any device having memory, including a digital camera, a CD ROM, a disk drive or the like.

The system includes means (e.g. within the processor 104) for organizing the image automatically using the meta data. For example, the processor 104 organizes the images according to meta data of the images 108. The images 108 are organized when the photobook 124 is output. The meta data can include a time when the image was stored, and the processor 104 can organize the images 108 by ordering the images 108 in chronological order according to when the images 108 were stored. The processor 104 can also, for example, organize the images by grouping the images according to location data associated with the images. As such, if the images were captured at two separate locations, the processor 104 can organize the images by ordering them according to the two separate locations where the images were captured. In addition to meta data captured by the camera, the processor can also use image analysis to generate additional meta data for image organization. For example, if face detection is performed on each image, the photos can be organized based on the number of people present.

In addition to selecting images, the system includes means (e.g. within the processor 104) for determining an attribute value for an attribute associated with each of the images 108. The attribute associated with the images 108 can include a contrast level, a brightness level (e.g., average brightness), a lightness level, a luminance level, a sharpness level or the like.

The system includes means (e.g., within the processor 104) for adjusting the attribute value associated with at least one of the images to render the attribute value of the images uniform. For example, if the processor 104 determines a value of 200 for the desired brightness level attribute of images 108a through 108e of the images 108, using any available brightness determination technique, the processor 104 adjusts the brightness value of each image such that the brightness value of all images is 200. It should also be noted that the processor 104 may also change the attribute value on each image in a group. To further illustrate, an attribute value may be changed for all images captured in the same location.

The system includes means (e.g., within the processor 104) for determining a layout of the photobook 124 by using the meta data and by automatically adjusting spatial characteristics of the images. To further illustrate, the images 108 have a spatial arrangement as indicated by pages 124a and 124b based on user input. The pages 124a and 124b can have templates 120 and 122 defined by a user, or configured in any manner. When the photobook 124 is output, the images 108 are output using the attribute value and the layout such that the images spatially arrange according to the templates 120 and 122.

The templates 120 and 122 can have additional configurations such that any number of images can fit on pages 124a and 124b. For example, a user can define the templates 120 and 122 such that one image, two images, three images, four images, and so forth fit on the pages 124a and 124b. During operation of the system 100, if a user desires that each page have no more than three images, the processor 104 can select a template having a maximum of three images per page, as illustrated by the embodiment of FIG. 1.

When the processor 104 determines the layout of the photobook 124, the processor 104 adjusts (for example, reduces and/or enlarges by cropping or resizing) various spatial characteristics of the images 108 such that the images 108 fit within the templates 120 and 122. For example, the processor 104 can adjust dimensions $B_1$ of the image 108a, $B_2$ of the image 108b and $B_4$ of the image 108c to a dimension $B_3$ of the template 120. The processor 104 can also adjust dimension $B_4$ of the images 108d and 108e to dimension $B_5$, as shown in FIG. 1. The processor 104 can spatially adjust dimensions in addition to the dimensions $B_1$ through $B_5$ to fit the images 108a through 108e onto the templates 120 and 122, such as height or the like. The actual adjustment can be implemented in any desired manner. For example, when enlarging one dimension, such as the horizontal dimension of the image, the vertical dimensions of the image can, if desired, be enlarged to retain the original height-to-width proportion (i.e. aspect ratio) of the image. Alternatively, or in combination, the image can be cropped either before or after any such enlarging operation to satisfy the specified dimensions of the template.

In addition to the processor 104, the system 100 can include means for outputting the photobook 124 represented as an output device 118. The output device 118 can be any electronic device which allows viewing of the photobook 124 by a user, such as a monitor, a screen of a personal digital assistant or the like. In addition, the output device can be any electronic device capable of outputting a hard copy of the photobook 124, such as a printer or the like. The photobook can be stored on any electronic medium such as a database accessible via the Internet, a hard disk or the like which is accessible by the output device 118 using a processor.

Figure 2A:
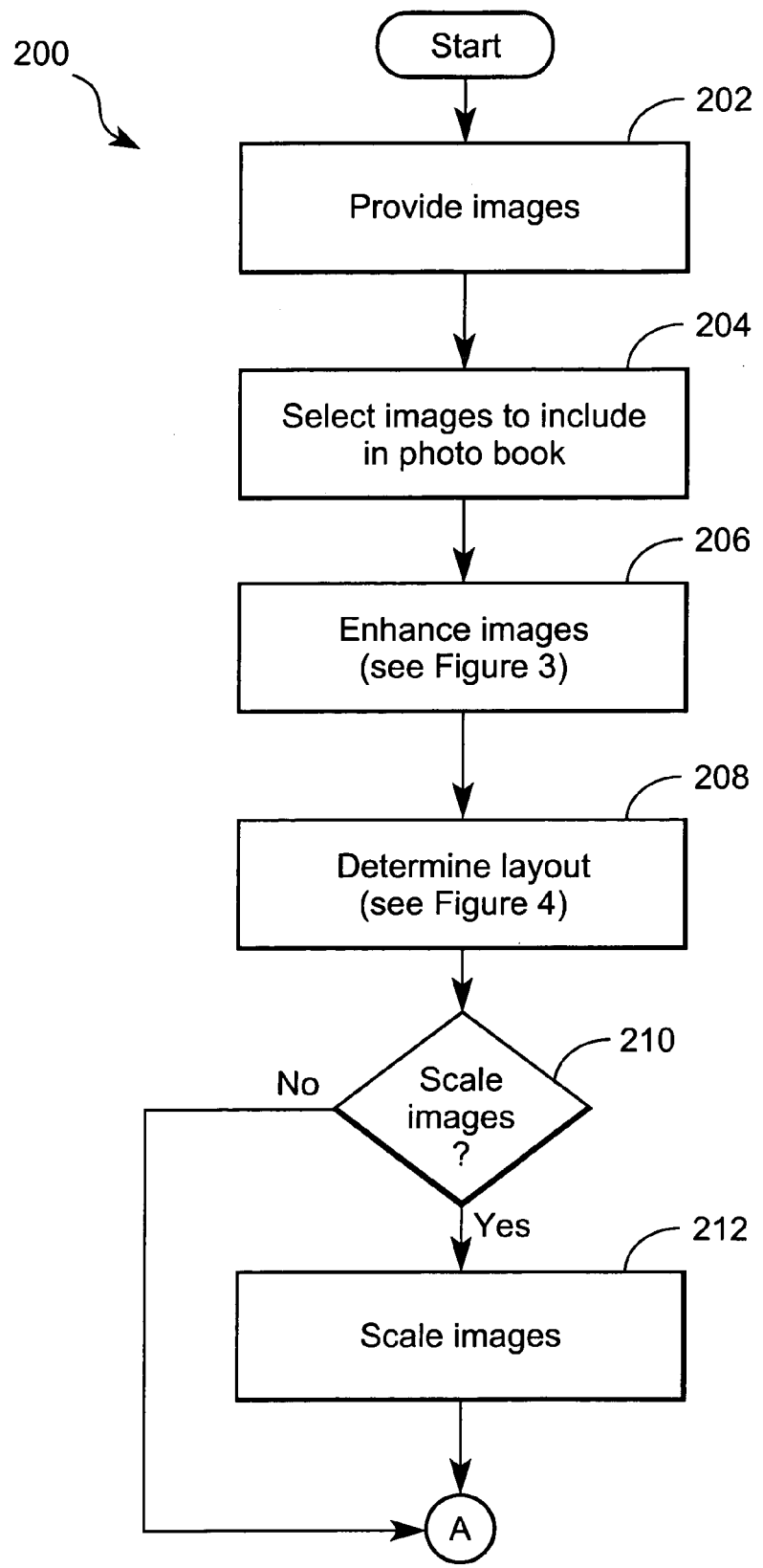
FIG. 2A illustrates an exemplary method for producing a set of images as a photobook in accordance with an embodiment of the present invention.

FIG. 2A illustrates an exemplary method 200 for producing a set of images as a photobook in accordance with an embodiment of the present invention. In a step, or an operation 202, images are provided from any desired source, and can be optionally stored on any device having memory. An operation 204 selects a set of images, wherein meta data is associated with each image. For example, in the FIG. 1 and the system 100, the images 108 are provided. After the images 108 are provided, the processor 104 selects the images 108a through 108e from the images 108 to include in the photobook 124, based on an input by a user. The processor 104 retrieves the selected set of images from memory which can be either remote or local to the processor 104. Once the processor 104 selects images from the set of images 108 for inclusion in the photobook 124, an operation 206 is performed where the images are enhanced.

The images provided in the operation 202 and selected in the operation 204 include attributes associated with each image. These attributes can include a lightness level, a contrast level, a brightness level, a sharpness level or the like. The method 200 ascertains an attribute value for an attribute associated with each image of the set of images such as a value for the brightness level of each image.

Figure 3:
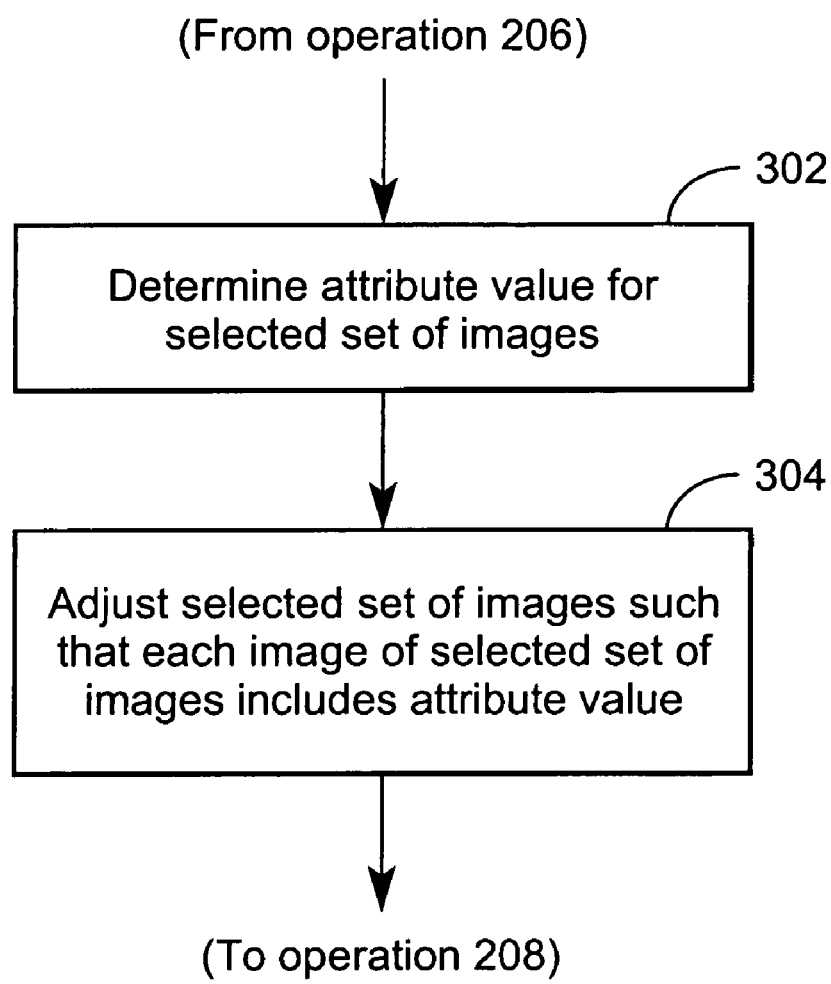
FIG. 3 is an exemplary embodiment of the present invention showing an operation for enhancing images of a photobook.

In the FIG. 2A and the operation 206, the images selected in the operation 204 are enhanced such that the images have uniform attributes, as more clearly shown with reference to FIG. 3. FIG. 3 is an embodiment of the present invention showing the operation 206 of FIG. 2A. During the operation 206, an operation 302 is performed where the method 200 determines an attribute value for the images selected in the operation 204.

During the operation 302, the processor 104 shown in FIG. 1 determines an average value for the brightness level of the images 108a through 108e. In this example, the images 108a through 108e have brightness levels of 150, 150, 200, 200 and 200 due to lighting differences of an environment of the images 108a and 108b (i.e., candlelight for the images 108a and 108b and daytime lighting for the images 108c through 108e). The difference in brightness values does not allow for uniform appearance of the images 108. Thus, the processor 104 determines that the average attribute value for the brightness level of each image to be included in the photobook should be 200 in the operation 302.

Once an attribute value is determined for the selected set of images, the method 200 performs an operation 304 where the attribute values are adjusted for each image of the selected set of images thereby rendering the attribute values uniform. As referenced herein, "uniform" is a relative term which means that at least one selected attribute for each image is examined, and if necessary, adjusted to fall within a desired tolerance such as +/−10% or any other specified tolerance. In accordance with an exemplary embodiment of the present invention, attributes may be adjusted using any suitable technique, such as histogram transformations as discussed in *Handbook of Image and Video Processing*, San Diego, Academic Press, 2000. pp. 22–31, ISBN 0-12-119790-5, Library of Congress Catalog Number 99-69120. The processor 104 in FIG. 1 determined in the operation 302 that the brightness level should be 200. As such, in the operation 304, the processor 104 adjusts the average brightness level of the images 108a and 108b to 200, thereby rendering the attribute value of the brightness level uniform for the images 108a through 108e of the images 108.

Once the attribute value of the images are adjusted in FIG. 3 such that the attribute values for each of the images are uniform, the method 200 performs an operation 208 of FIG. 2A. In the operation 208, the method 200 lays out the photobook.

Figure 4:
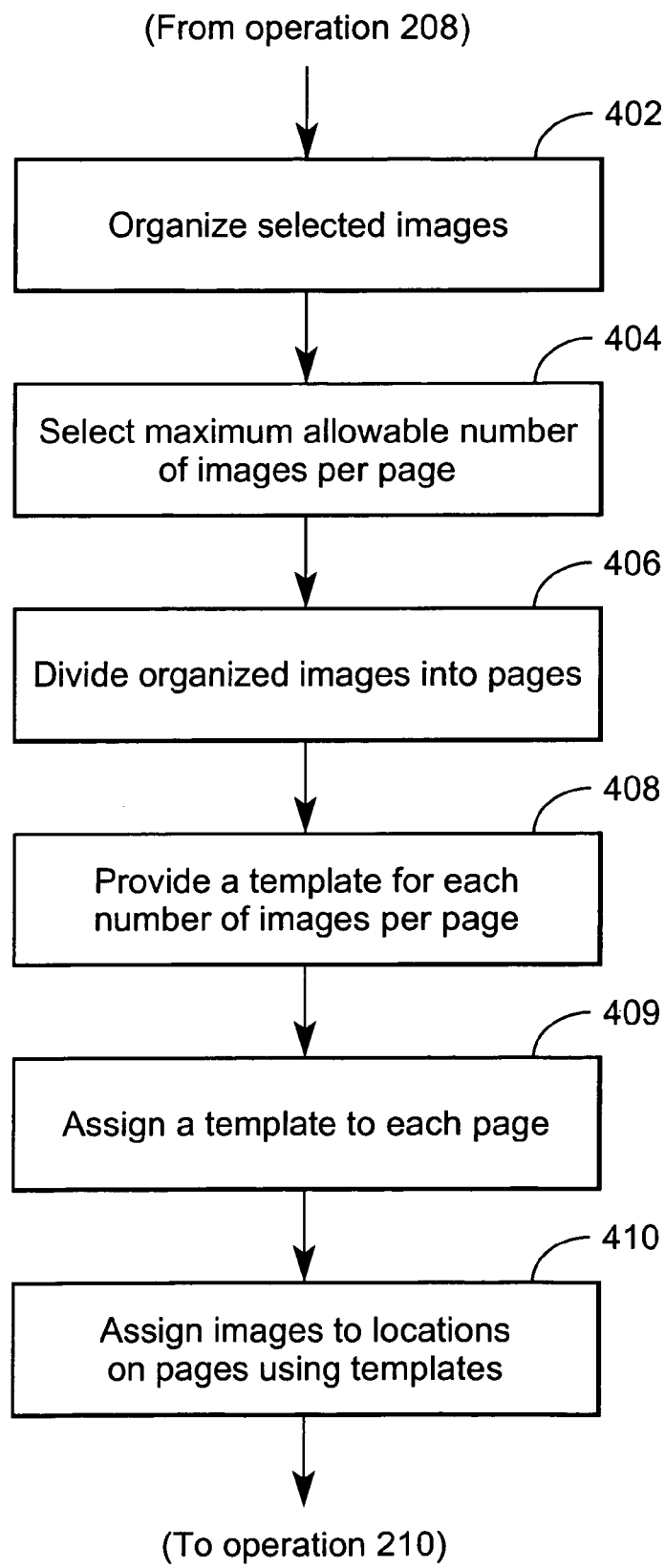
FIG. 4 illustrates an exemplary operation for determining a layout for a photobook in accordance with an embodiment of the present invention.

FIG. 4 illustrates an exemplary operation 208 for laying out the photobook. In an operation 402, the selected images are organized thereby grouping and ordering the images. The images can be organized according to any criterion selected by either the method 200 or a user. The images can be organized (e.g. grouped, clustered, etc.), according to data associated with the images. Likewise, the images can be ordered chronologically according to data associated with each of the images.

The FIG. 1 images 108 include meta data associated with the images 108. The meta data includes information relating to the images 108a through 108e such as the location of where an image was captured and the time when the image was captured. In this example, the image 108a was taken prior to the image 108b at a location differing from the location of the image 108b. The image 108b was captured prior to the images 108c through 108e. Also, the images 108b through 108e were captured at the same location. Thus, in this example, a user can elect to organize the images chronologically. As such, the processor 104 orders the images 108 in chronological order whereby the image 108a appears first in the photobook 124 and the images 108b through 108e appear thereafter. Alternately, the processor 104 can group or cluster the images 108a through 108e according to the location of where the images 108a and 108b were captured. In this alternative embodiment, the processor 104 clusters the images 108a through 108e in the photobook 124 such that the images 108b through 108e appear prior to the image 108a.

After the method 200 organizes the images 108 in the operation 402, the method selects a maximum allowable number of images per page according to input by a user or according to a default setting in an operation 404. As referenced herein, the term "page" refers to any renderable manifestation occupying a definable area. Accordingly, the term page may refer to a page of a printed photoalbum, a page of an Internet website, a volume of space occupying memory for display on an output device such as a computer monitor or the display of a personal digital assistant, or the like. Once the user selects the maximum allowable number of images per page, the method performs an operation 406.

In the operation 406, the images which were organized are divided into pages for the photobook. For example, the user can select three images per page as the maximum allowable number of images per page in the operation 404. The user can select any maximum allowable number of images per page (for example, one image per page, ten images per page, and so forth).

After the user selects the maximum allowable number of images per page, the method divides the organized images into pages. In this example, the images 108a through 108e include five images organized in chronological order. As such, the processor 104 divides the organized images into two pages where three images appear on the page 124a of the photobook 124 and two images appear on the page 124b of the photobook 124. If the user selects the maximum allowable number of five images per page, then the processor 104 divides the images 108a through 108e onto the page 124a of the photobook 124. After dividing the organized images into pages of the photobook, the method 200 performs the operation 408.

In the operation 408, the method provides a template for each number of images per page. The templates can be pre-defined by a user prior to implementation of the method 200. Each of the templates can have any configuration which assigns any number up to the selected maximum number of images per page in a defined area, such as the templates 120 and 122. In FIG. 1, the template 120 assigns three images to a page in defined areas 120a through 120c and the template 122 assigns two images to a page in defined areas 122a and 122b. The templates 120 and 122 determine a layout of the photobook by automatically adjusting spatial characteristics of the images within the photobook. In an alternative exemplary embodiment, the templates 120 and 122 can assign any number of images per page (i.e. five images per page and so forth).

Upon completion of the operation 408, the method 200 performs an operation 409. As discussed with reference to the operation 406, the method divides the organized images into pages. In the operation 409, the method then assigns the templates provided in the operation 408 to each page organized by the method in the operation 406. Once the method completes the operation 409, an operation 410 is performed where the selected images are assigned to locations on the pages using the templates, as shown with reference to FIG. 4.

After determining a layout of the photobook, the method prepares the photobook by performing processes generally referred to as image enhancement processes. Image enhancement processes can, for example, be used to alter or improve the appearance of the images while image layout processes prepare and position the images on the pages of the photobook.

In the example, during the operation 408, the method 200 provides the FIG. 1 templates 120 and 122, and assigns the template 120 to the page 124a and the template 122 to the page 124b. Once the templates 120 and 122 are assigned to the pages 124a and 124b, the processor 104 assigns the images 108a through 108e to the defined areas 120a through 120c, 122a and 122b of the templates 120 and 122 in the operation 410. The images 108a through 108e are assigned to the defined areas 120a through 120c and 122a and 122b according to the operations 402 and 404 where the images 108a through 108e were organized. In this example, the template 120 appears on the page 124a of the photobook prior to the page 124b of the photobook 124. In the FIG. 1 example, the images 108a through 108c are assigned to the defined areas 120a through 120c of the template 120. Additionally, the images 108d and 108e are assigned to the defined areas 122a and 122b of the template 122. Once the images 108 are assigned to the defined areas 120a through 120c, 122a and 122b, the FIG. 2 operation 210 is performed.

In the operation 210, the method 200 determines whether or not the images should be scaled. The method 200 bases this determination on, for example, a fit of the images on the defined areas of the template in the operation 410. If one of the images does not fit within the defined area of the template, the method scales the image and any other images which do not fit in their defined area in an operation 212. In the operation 212 the images are scaled using any suitable technique, including, without limitation, those disclosed in U.S. Pat. Nos. 6,058,248 and 6,075,926, the disclosures of which are hereby incorporated by in reference in their entireties. It should be noted that the scaling operations can include either upscaling or downscaling using any suitable technique. If the method 200 determines that scaling the images is not necessary, an operation 214 can be performed.

Figure 2B:
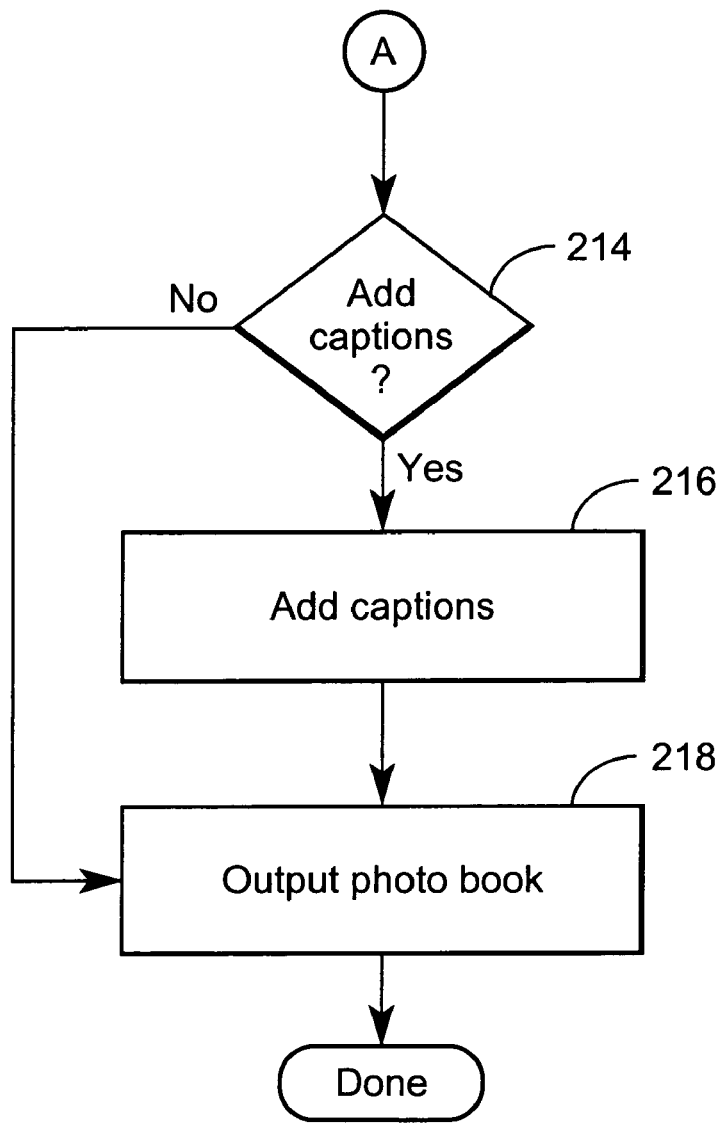
FIG. 2B illustrates an exemplary method for producing a set of images as a photobook in accordance with an embodiment of the present invention.

The method 200 determines in the operation 210 that the images 108a through 108c should be scaled to fit within the defined areas 120a through 120c. As such, the method 200 scales the images 108a through 108c in the operation 212. Upon completion of the operation 212, the method 200 performs the operation 214 as shown in FIG. 2B.

In the operation 214, the method determines if captions should be added based on user input. If a user desires to input captions, the method 200 adds the captions to the images in an operation 216. If the method determines that no captions are to be added in the operation 214, the method performs the operation 218 where the photobook is output. In the FIG. 1 example, a user desires to place captions with the images 108a and 108e of the images 108. For example, the user inputs captions to the processor 104 and the captions are added to the images 108a and 108e in the operation 216. In an alternative exemplary embodiment, the captions could consist of meta data extracted from the images, such as the capture time and the location of each image. Upon completion of the operation 216, the photobook 124 is output in the operation 218. The FIG. 1 photobook 124 can be output using the output device 118.

As may be appreciated, exemplary embodiments of the present invention provide a method for automatically producing a photobook having uniform images with little user input. These exemplary embodiments can provide an attractive alternative to users having minimal computer skills who wish to generate their own photobooks using images and output this photobook in multiple formats.

The functionality of the present invention can be embodied by computer-executable instructions, such as program modules, that are stored on a computer readable medium and executed by a computer. Program modules can include routines, programs, objects, components, data structures, and so forth that perform particular tasks or implement particular abstract data types. The instructions and/or program modules can be stored at different times in various computer-readable media that are either part of a computer implementing the software application or that can be read by the computer. Programs are typically distributed, for example, on floppy disks, CD-ROMs, DVD, or some form of communication media such as a modulated signal. From there, they can be installed or loaded into the secondary memory of a computer. At execution, they can be loaded at least partially into the computer's primary electronic memory or can be initially saved in the primary electronic memory.

Exemplary embodiments described herein includes these and other various types of computer-readable media when such media contain instruction programs, and/or modules for implementing the operations described below in conjunction with a microprocessor or other data processors. Exemplary embodiments can also include the computer itself when programmed as described herein.

While the invention has been described in detail with reference to the preferred embodiments thereof, it will be apparent to one skilled in the art that various changes and modifications can be made and equivalents employed, without departing from the present invention.

What is claimed is:

1. A system for producing a photobook, the system comprising:
    a means for selecting images, where each image includes meta data;
    a means for determining an attribute value for an attribute associated with each of the images;
    a means for adjusting the attribute value associated with at least one of the images to render the attribute value of the images uniform;
    a means for determining a layout of the photobook by automatically adjusting spatial characteristics of the images within the photobook and automatically organizing the images using the meta data; and
    a means for outputting the photobook.

2. The system of claim 1, wherein the images include digital photos, scanned film, slides, or photos.

3. The system of claim 1, wherein the attribute associated with the at least one of the images is a contrast level.

4. The system of claim 1, wherein the attribute associated with the at least one of the images is a brightness level.

5. The system of claim 1, wherein the means for determining a layout of the photobook is a processor which organizes the images according to a time associated with an image of the images.

6. The system of claim 1, wherein the means for determining a layout of the photobook is a processor which organizes the images by grouping the images according to location data associated with the images.

7. The system of claim 1, wherein the means for determining a layout of the photobook is a processor which determines a layout of the photobook according to a maximum allowable number of images per page to be placed on a page of the photobook.

8. The system of claim 7, wherein the photobook page is a renderable manifestation occupying a definable area.

9. The system of claim 7, wherein the processor of the means for determining a layout of the photobook determines a layout of the photobook by dividing the organized set of images into pages of the photobook using the maximum allowable number of images per page.

10. The system of claim 9, wherein the processor of the means for determining a layout of the photobook determines a layout of the photobook by assigning a template for each number of images to each page of the photobook pages wherein the template assigns images to the photobook page using the maximum allowable number of images per page.

11. The system of claim 10, wherein the template assigns locations to images on a defined area of the template.

12. The system of claim 11, wherein the template is user defined.

13. A method for producing a set of images as a photobook, the method comprising:
    selecting a set of images, where each image includes meta data;
    determining an attribute value for an attribute associated with each of the images;
    adjusting the attribute value associated with at least one of the images to render the attribute value of the images uniform;
    determining a layout of the photobook by automatically adjusting spatial characteristics of the images within the photobook and automatically organizing the images using the meta data; and outputting the photobook using the attribute value and the layout.

14. The method of claim 13, wherein the images include digital photos, scanned film, slides, or photos.

15. The method of claim 13, wherein the attribute associated with the at least one of the images is a contrast level.

16. The method of claim 13, wherein the attribute associated with the at least one of the images is a brightness level.

17. The method of claim 13, wherein organizing the images comprises:
   ordering the images according to a time associated with the images; and/or
   grouping the images according to location data associated with the images.

18. The method of claim 17, wherein determining a layout of the photobook comprises:
   selecting a maximum allowable number of images per page to be located on a page of the photobook;
   dividing the organized images into pages of the photobook using the maximum allowable number of images per page;
   providing a template for each number of images to each page of the photobook pages where the template assigns images to the photobook page using the maximum allowable number of images per page; and
   assigning images to locations on the photobook pages.

19. The method of claim 18, wherein the template assigns the images to a defined area of the template.

20. The method of claim 19, wherein the template is user defined.

21. The method of claim 13, wherein automatically adjusting spatial characteristics of the images within the photobook comprises:
   cropping the images within the photobook.

22. The method of claim 13, wherein automatically adjusting spatial characteristics of the images within the photobook comprises:
   scaling the images within the photobook.

23. The method of claim 13, comprising:
   adding captions to the images.

24. A computer readable medium having a program for producing a photobook by executing the following procedure:
   responding to a request to select a set of images, where each image of the images includes meta data;
   determining an attribute value associated with each of the images;
   adjusting the attribute value associated with at least one of the images to render the attribute values of the images uniform;
   determining a layout of the photobook by automatically adjusting spatial characteristics of the images within the photobook and automatically organizing the images using the meta data; and
   outputting the photobook using the attribute value and the layout.

25. The computer readable medium of claim 24, wherein the images include digital photos, scanned film, slides, or photos.

26. The computer readable medium of claim 24, wherein the attribute associated with the at least one of the images is a contrast level.

27. The computer readable medium of claim 24, wherein the attribute associated with the at least one of the images is a brightness level.

28. The computer readable medium of claim 24, wherein the operation of organizing includes at least one of the following:
   ordering the images according to a time associated with the images; and
   grouping the images according to location data associated with the images.

29. The computer readable medium of claim 28, wherein the operation of determining a layout of the photobook comprises:
   selecting a maximum allowable number of images per page to be located on a page of the photobook;
   dividing the organized images into pages of the photobook using the maximum allowable number of images per page;
   providing a template for each number of images to each page of the photobook pages where the template assigns images to the photobook page using the maximum allowable number of images per page; and
   assigning images to locations on the photobook pages.

30. The computer readable medium of claim 29, wherein the template assigns the images to a defined area of the template.

31. The computer readable medium of claim 30, wherein the template is user defined.

32. The computer readable medium of claim 24, having a program for:
   responding to a request to add captions to the images.

33. A method for producing a set of images as a photobook, the method comprising:
   selecting images, where each image of the images includes meta data;
   determining an attribute value for an attribute associated with each of the images;
   adjusting the attribute value associated with at least one of the images to render the attribute value of the images uniform;
   grouping the images automatically using the meta data;
   determining a layout of the photobook by automatically cropping and scaling the images within the photobook and automatically organizing the images using the meta data; and
   outputting the photobook.

34. The method of claim 33, wherein organizing the images comprises:
   ordering the images according to a time associated with the images; and/or
   grouping the images according to location data associated with the images.

35. The method of claim 34, wherein determining a layout of the photobook comprises:
   selecting a maximum allowable number of images per page to be located on a page of the photobook;
   dividing the organized images into pages of the photobook using the maximum allowable number of images per page;
   providing a template for each number of images to each page of the photobook pages where the template assigns images to the photobook page using the maximum allowable number of images per page; and
   assigning images to locations on the photobook pages.

36. The method of claim 35, wherein the template assigns the images to a defined area of the template.

37. The method of claim 36, wherein the template is user defined.

38. The method of claim 33, comprising:
   adding captions to the images.

* * * * *